(12) United States Patent
Chakravarti et al.

(10) Patent No.: US 9,145,525 B2
(45) Date of Patent: Sep. 29, 2015

(54) ACID GAS MANAGEMENT IN LIQUID FUEL PRODUCTION PROCESS

(71) Applicants: Shrikar Chakravarti, East Amherst, NY (US); Raymond F. Drnevich, Clarence Center, NY (US); Minish M Shah, East Amherst, NY (US)

(72) Inventors: Shrikar Chakravarti, East Amherst, NY (US); Raymond F. Drnevich, Clarence Center, NY (US); Minish M Shah, East Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 209 days.

(21) Appl. No.: 13/927,880

(22) Filed: Jun. 26, 2013

(65) Prior Publication Data
US 2015/0005398 A1 Jan. 1, 2015

(51) Int. Cl.
| | |
|---|---|
| *C07C 27/00* | (2006.01) |
| *C10K 1/00* | (2006.01) |
| *C10G 2/00* | (2006.01) |
| *C01B 3/24* | (2006.01) |
| *C01B 3/38* | (2006.01) |
| *C10J 3/00* | (2006.01) |
| *C10K 3/06* | (2006.01) |

(52) U.S. Cl.
CPC . *C10K 1/004* (2013.01); *C01B 3/24* (2013.01); *C01B 3/38* (2013.01); *C10G 2/30* (2013.01); *C10J 3/00* (2013.01); *C10K 1/005* (2013.01); *C10K 3/06* (2013.01); *C10J 2300/093* (2013.01); *C10J 2300/0916* (2013.01); *C10J 2300/0943* (2013.01); *C10J 2300/0959* (2013.01); *C10J 2300/0969* (2013.01); *C10J 2300/0976* (2013.01); *C10J 2300/1659* (2013.01); *C10J 2300/1678* (2013.01)

(58) Field of Classification Search
CPC ............... C10G 2/30; C10J 2300/0969; C10J 2300/0976; C10J 2300/1659; C10J 3/00; C10K 1/004
USPC .................................................. 518/700, 702
See application file for complete search history.

(56) References Cited

U.S. PATENT DOCUMENTS

| | | | |
|---|---|---|---|
| 3,972,958 A | 8/1976 | Garwood et al. | |
| 4,407,973 A | 10/1983 | Van Dijk et al. | |
| 4,443,560 A | 4/1984 | Le Blanc, Jr. et al. | |
| 4,675,344 A | 6/1987 | Conway et al. | |
| 4,775,696 A | 10/1988 | Prada-Silva et al. | |
| 4,831,060 A | 5/1989 | Stevens et al. | |
| 4,882,360 A | 11/1989 | Stevens | |
| 4,888,131 A | 12/1989 | Goetsch et al. | |
| 5,554,351 A | 9/1996 | Primdahl | |
| 6,136,577 A | 10/2000 | Gaddy | |
| 6,486,219 B1 | 11/2002 | Janda et al. | |
| 6,958,363 B2 | 10/2005 | Espinoza et al. | |
| 6,974,844 B2 | 12/2005 | Steynberg | |
| 7,008,967 B2 | 3/2006 | Keyser et al. | |
| 7,087,652 B2 | 8/2006 | Abbott et al. | |
| 7,863,341 B2 | 1/2011 | Routier | |
| 7,983,341 B2 | 7/2011 | Wang | |
| 8,106,102 B2 | 1/2012 | Steynberg et al. | |
| 2008/0306171 A1 | 12/2008 | Van Hardeveld | |
| 2009/0121191 A1* | 5/2009 | Tillman | 252/373 |
| 2009/0246118 A1 | 10/2009 | Drnevich et al. | |
| 2009/0293359 A1 | 12/2009 | Simmons et al. | |
| 2010/0113624 A1 | 5/2010 | Routier et al. | |
| 2010/0158792 A1 | 6/2010 | Drnevich et al. | |
| 2011/0071229 A1 | 3/2011 | Robertson et al. | |
| 2011/0218254 A1 | 9/2011 | Chakravarti et al. | |
| 2012/0270957 A1 | 10/2012 | Kresnyak | |
| 2013/0079426 A1 | 3/2013 | Ravikumar et al. | |
| 2013/0109765 A1* | 5/2013 | Jiang et al. | 518/702 |

FOREIGN PATENT DOCUMENTS

| | | |
|---|---|---|
| EP | 0342610 A2 | 11/1989 |
| WO | WO99/55618 | 11/1999 |
| WO | WO 99/55618 * | 11/1999 |
| WO | WO2007/009984 A1 | 1/2007 |
| WO | WO2009/113006 A2 | 9/2009 |
| WO | WO2009/126769 A2 | 10/2009 |

OTHER PUBLICATIONS

Anderson, R. B. et al. "Synthesis of Alcohols by Hydrogenation of Carbon Monoxide". Industrial and Engineering Chemistry, vol. 44, No. 10. (1952) pp. 2418-2424.
Eilers, J. et al. "The Shell Middle Distillate Synthesis Process (SMDS)", J. C. Baltzer A. G., Scientific Publishing Company, Catalysis Letters 7 (1990) pp. 253-270.
Phillips, S. et al. "Thermochemical Ethanol via Indirect Gasification and Mixed Alcohol Synthesis of Lignocellulosic Biomass". Technical Report, NREL/TO-10-41168, Apr. 2007.

(Continued)

*Primary Examiner* — Jafar Parsa
(74) *Attorney, Agent, or Firm* — Iurie A. Schwartz

(57) ABSTRACT

A process and method for producing liquid fuel product from hydrogen and carbon monoxide containing streams produced by gasifying solid carbonaceous feedstock and steam reforming of light fossil fuels. The gasifier syngas is treated to preferentially remove at least 99% of sulfur containing impurities and less than 50% of the $CO_2$ to produce a treated gasifier syngas and a $CO_2$ enriched gas. The treated gasifier syngas and the light fossil fuel conversion unit product gas are combined to form a mixed syngas that is converted into a liquid fuel product. The $CO_2$ enriched gas is used in the gasification unit.

16 Claims, 2 Drawing Sheets

(56) References Cited

OTHER PUBLICATIONS

Reed & Gaur. "A Survey of Biomass Gasification-2001". $2^{nd}$ Edition, survey for the National Renewable Energy Laboratory (NREL) and Biomass Energy Foundation, published by Bef Press Books, 2001, Chapter 1, pp. 1-1 to 1-24 and Chapter 3, pp. 3-1 to 3-7, 3-17 to 3-26 and 3-46 to 3-51.

"Survey and Down-Selection of Acid Gas Removal Systems for the Thermochemical Conversion of Biomass to Ethanol with a Detailed Analysis of an MDEA System", Task 1: Acid Gas Removal Technology Survey and Screening for Thermochemical Ethanol Synthesis; Task 2: Detailed MDEA Process Analysis National Renewable Energy Laboratory, Subcontract Report: NREL/SR-5100-50482 (May 2011).

* cited by examiner

ACID GAS MANAGEMENT IN LIQUID FUEL PRODUCTION PROCESS

BACKGROUND OF THE INVENTION

1. Field of the Invention

The present invention relates to acid gas management schemes in the production of liquid fuels from hydrogen and carbon monoxide containing streams using light fossil fuel (for e.g. methane, natural gas, liquefied petroleum gas, naphtha), and solid feedstock such as biomass, coal, petroleum coke and the like.

2. Description of Related Art

Liquid fuels can be produced from solid feedstock materials by first gasifying the solid feedstock material to form hydrogen and carbon monoxide containing stream (gasifier syngas) that is further treated to form desired liquid fuel product.

Gasification of feedstocks such as coal or petroleum coke in an entrained flow gasifier generates a syngas with $H_2/CO$ ratio in the range of 0.4:1 to 0.8:1. $CO_2$ content of the syngas is typically <10 vol. %. Gasification of feedstocks such as biomass in a fluidized bed gasifier typically generates a syngas with H2/CO ratio in the range of 0.8:1 to 1.2:1. On a dry basis, $CO_2$ content of this syngas is in the range of 15-45 vol. %. Optimal $H_2/CO$ ratio for liquid fuel synthesis, e.g. Fischer-Tropsch (FT) liquids, methanol/gasoline, is around 2:1. Hence, the gasifier derived syngas typically undergoes the Water Gas Shift reaction to increase the $H_2/CO$ ratio. This further increases the $CO_2$ content of the syngas. Higher $CO_2$ in the syngas causes the $H_2$ and CO partial pressures to be lower, thus resulting in lower per pass and overall yield of liquid fuel and a higher flow rate of tail gas from the liquid fuel synthesis unit, which is typically sent to a fuel header.

Hence, coal-to-liquids (CTL) and biomass-to-liquids (BTL) projects contain provisions for $CO_2$ removal to low levels in order to reduce liquid fuels production system capital and operating costs.

To improve liquid fuel product yield several options are available to adjust the $H_2$:CO ratio in the feed to the liquid fuel production unit. For example, the gasifier syngas can be mixed with a hydrogen and carbon monoxide containing gas that has a higher $H_2$:CO ratio to form a mixture containing desirable $H_2$:CO ratio; or hydrogen can be added to the gasifier syngas to increase $H_2$:CO ratio, or some combination of these.

US Patent Application 2011/0218254 A1 teaches a method of using a light fossil fuel (e.g. natural gas) in an SMR/ATR/SMR-ATR system to produce a hydrogen rich syngas with $H_2$:CO ratio greater than 2:1 and mixing that hydrogen rich syngas with the gasifier syngas as a means for adjusting the $H_2$:CO ratio of the mixed syngas entering the unit that converts the mixed syngas to liquid. It also mentioned options for $CO_2$ and $H_2S$ removal at different locations in the overall flow sheet without pointing out preferred scheme(s) or location(s).

U.S. Pat. No. 7,863,341 (assigned to Shell) discusses blending a $H_2$-rich syngas from a light hydrocarbon feed with a gasifier derived syngas stream to adjust the $H_2$:CO ratio of the syngas being fed to the liquids synthesis unit. Use of an acid gas removal system with one or more units to remove $H_2S$ and $CO_2$ from the gasifier derived syngas is mentioned in general terms. No specifics are provided. It also mentions tail gas from the Fischer-Tropsch liquid fuels synthesis as a fuel source for the reforming unit generating the $H_2$-rich syngas. Again, no specifics are provided.

U.S. Pat. No. 8,106,102 (assigned to SASOL and Haldor Topsoe) describes a Gas to Liquids process (no solid feedstock is utilized) where the tail gas from the liquids synthesis unit is reformed in a separate unit from the one that reforms the feed gas, such as natural gas.

Integrated Gasification Combined Cycle (IGCC) systems contain acid gas removal units that are typically designed for selective $H_2S$ removal. $CO_2$ not removed by the acid gas removal (AGR) unit is rejected with the flue gas generated by combustion of gasifier derived syngas in the gas turbine section. However, IGCC systems primarily focus on making electricity and to a limited extent on liquid fuels production.

The need continues to exist for a liquid fuel production method and plant with lower capital and operating costs. It is an object of the present invention: to process liquid fuel product from hydrogen and carbon monoxide containing gases formed by converting solid feedstock using oxygen and by reforming and/or partial oxidation of light fossil fuels by utilizing
- a smaller acid gas removal (AGR) system designed to remove all the $H_2S$ but only a portion of $CO_2$ from the gasifier syngas. Typically, greater than 50%, and preferably greater than 65% of the $CO_2$ in the gasifier syngas entering the AGR system leaves with the treated gasifier syngas
- a lower cost amine system versus one that uses physical solvents for acid gas removal
- a smaller sulfur recovery unit to recover sulfur in solid or liquid form from the acid gas stream leaving the acid gas removal system.

Other objects and aspects of the present invention will become apparent to one of ordinary skill in the art upon review of the specification, drawings and claims appended hereto.

SUMMARY OF THE INVENTION

According to an aspect of the invention, a method and system is provided for producing liquid fuel product from solid feedstock materials and light fossil fuels for converting a solid carbonaceous material (10) in a gasification unit (2) to form a gasifier syngas (24); passing the gasifier syngas (24) to a gas conditioning unit (4), and treating the gasifier syngas (24) therein forming: at least a treated gasifier syngas stream (26) containing at least 50% of $CO_2$ in the gasifier syngas (24), a $CO_2$-enriched gas stream (7A), and a sulfur-enriched stream (500); utilizing at least a portion of the $CO_2$-enriched gas stream (7A) containing at least 90% of $CO_2$ removed from the gasifier syngas in the formation of gasifier syngas (24). It also provides for converting a light fossil fuel (18) in a light fossil fuel conversion unit (6) to form a $H_2$-rich syngas (27) comprising $H_2$ and CO at a $H_2/CO$ mole ratio of at least 2:1; combining treated gasifier syngas (26) and $H_2$-rich syngas (27) to form a mixed syngas (30) having a $H_2/CO$ ratio greater than that of treated gasifier syngas stream (26); converting the mixed syngas (30) to form at least a liquid fuel product (32) and a byproduct stream (34) comprising one or more of hydrogen, CO, water vapor, methane, and hydrocarbons containing 2 to 8 carbon atoms and 0 to 2 oxygen atoms. Furthermore it provides for reacting up to 100% of the byproduct stream (34) in the light fossil fuel conversion unit (6) to facilitate formation of the H2-rich syngas (27); and utilizing the CO2-enriched gas stream (7D) to facilitate formation of the gasifier syngas (24).

BRIEF DESCRIPTION OF THE FIGURES

The objects and advantages of the invention will be better understood from the following detailed description of the preferred embodiments thereof in connection with the accompanying figures wherein like numbers denote same features throughout and wherein.

DETAILED DESCRIPTION OF THE INVENTION

Figure 1:
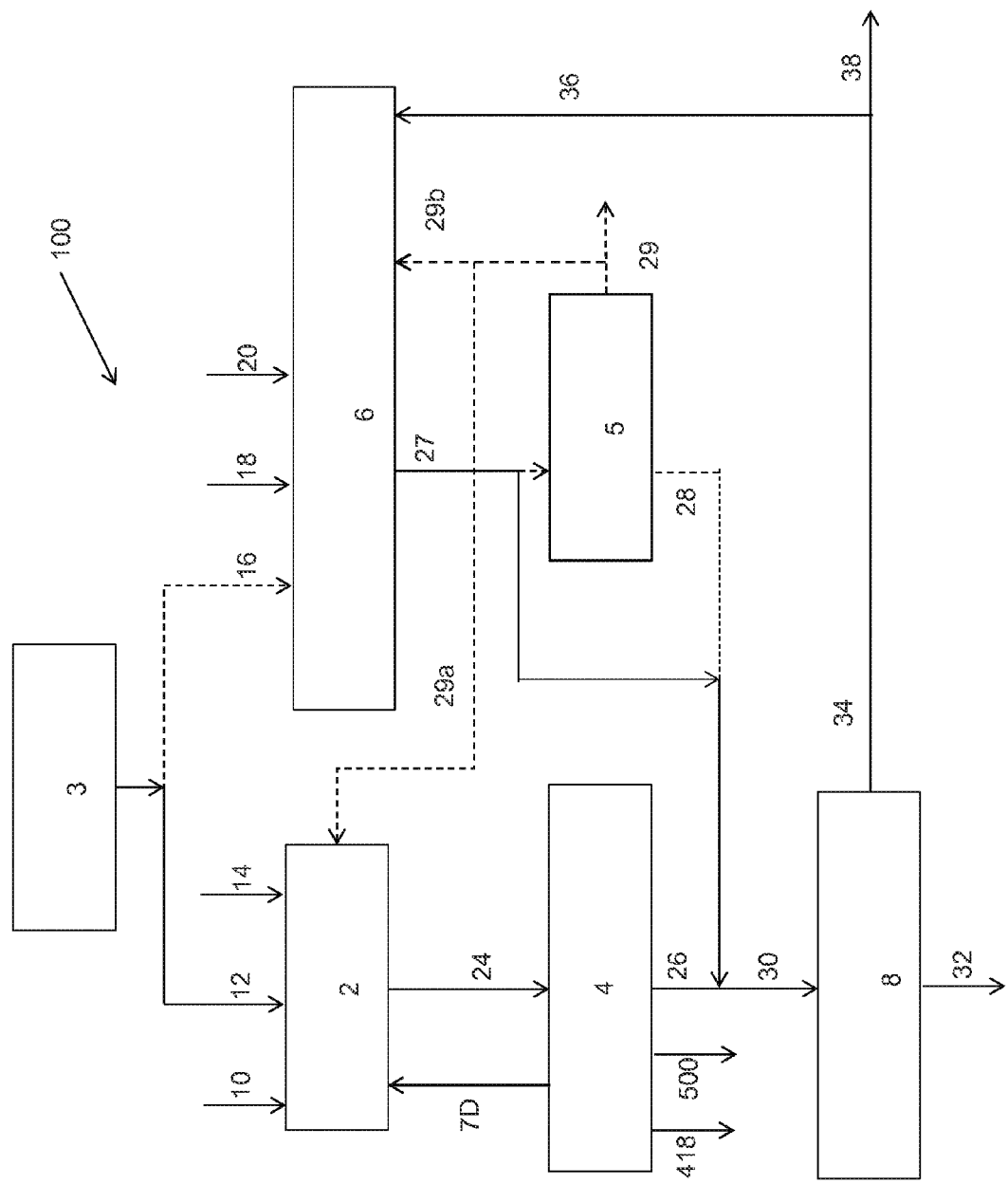
FIG. 1 is a block diagram of the hybrid plant.

The following description will refer to embodiments in which hydrogen and carbon monoxide containing streams produced from gasification of solid feed material and from reforming of light fossil fuel are further treated to produce liquid fuels and/or chemicals such as alcohols, Fischer Tropsch liquids, gasoline, diesel, olefins and the like.

As used herein, "solid feed material," "solid feedstock," "solid carbonaceous feed material," and "carbonaceous feed material" are used interchangeably and refer to biomass, coal of any rank (including anthracite, bituminous, and lignite), coke produced from coal of any rank, petroleum coke, or bitumen.

As used herein, "biomass" refers to algae or material containing any of cellulose or hemicellulose or lignin, including but not limited to Municipal Solid Waste (MSW), wood (including cut timber; boards, other lumber products, and finished wooden articles, and wood waste including sawdust), and vegetable matter such as grasses and other crops, as well as products derived from vegetable matter such as rice hulls, rice straw, soybean residue, corn stover, and sugarcane bagasse.

As used herein, "light fossil fuel" refers to product useful as fuel that is either found in deposits in the earth and used in the form as found, or produced by reparatory and/or chemical processing of product that is found in deposits in the earth. Examples of light fossil fuel include natural gas, refinery off-gas, naphtha, liquefied petroleum gases, associated gas, coal-bed methane, shale gas, landfill gas, biogas, and some combination thereof.

As used herein, "product fuel" also referred to as "liquid fuel product" means hydrocarbon material (which includes oxygenated hydrocarbon material) useful as fuel and containing product selected from the group consisting of alkanes liquid at 25 C and atmospheric pressure, alkenes liquid at 25 C and atmospheric pressure, alkanols liquid at 25 C and atmospheric pressure, and mixtures thereof.

As used herein, "gasifier syngas" refers to the hydrogen and carbon monoxide containing stream produced in a gasification unit.

As used herein, "treated gasifier syngas" refers to the hydrogen and carbon monoxide containing stream derived from a gasifier syngas that is substantially depleted of sulfur compounds and contains less $CO_2$ than the gasifier syngas.

As used herein, "$H_2$-rich syngas" refers to the hydrogen and carbon monoxide containing stream produced in a light fossil fuel conversion unit.

As used herein, "gasification unit" includes one or more parallel gasification trains, where a gasification train includes a gasifier employing known gasifier technology as well as downstream unit operations such as particulate removal, COS hydrolysis and heat recovery.

As used herein, "light fossil fuel conversion unit" includes an autothermal reformer (ATR) and/or ATR coupled with a steam methane reformer (SMR).

As used herein, "liquid fuel production unit" refers to the system that produces liquid fuel product from hydrogen and carbon monoxide containing gas. In addition to the catalytic reactors used to synthesize the liquid fuel product, the liquid fuel production unit may include a separation/upgrading/refining section.

As used herein "design production rate" refers to the rate of liquid fuels production when the gasification unit, the light fossil fuel conversion unit, the liquid fuel production unit, as well as any other unit in fluid communication with one or more of these units are all operational and operating at design capacity.

As used herein, "hybrid plant" refers to a plant containing a gasification unit for producing gasifier syngas from solid feedstock, a light fossil fuel conversion unit for producing $H_2$-rich syngas from light fossil fuels, and a liquid fuel production unit for converting hydrogen and carbon monoxide derived from gasifier syngas and/or $H_2$-rich syngas into liquid fuel product.

As used herein "volumetric gas flow" refers to actual volumetric gas flow at operating temperature and pressure.

In the following description, disclosure of "treatment of a stream", such as disclosure that a stream is reacted or otherwise processed, or that a stream is fed to a processing step or is combined with another stream, is intended to include the indicated treatment of all or less than the entire stream, except where indicated otherwise herein.

With reference to FIG. 1, hybrid plant 100 includes a gasification unit 2, a gas conditioning unit 4, a light fossil fuel conversion unit 6, a liquid fuel production unit 8, an air separation unit 3 (optionally an offsite supply by pipeline) and optionally a carbon dioxide ($CO_2$) removal unit 5. Solid carbonaceous feed material 10 is reacted with oxygen 12 and steam 14 in the gasification unit to produce a gaseous stream 24 which contains at least hydrogen and carbon monoxide and which typically also contains other substances such as carbon dioxide, water vapor, hydrocarbons (including methane), particulate matter, and sulfur and nitrogen containing species.

The sulfur and nitrogen containing species, volatilized tars (if any), particulate matter and at least a portion of carbon dioxide present in stream 24 is removed in gas conditioning unit 4 to form treated gasifier syngas stream 26. Light fossil fuel 18, steam 20 and optionally oxygen 16 are processed in light fossil fuel conversion unit 6 to form H2-rich syngas stream 27, which is combined with treated gasifier syngas stream 26 to form stream 30, and converted in liquid production unit 8 to form liquid fuel product(s) 32 and gaseous byproduct (34). A portion or all of stream (34) is utilized in light fossil fuel conversion unit (6) to facilitate formation of syngas 27. Optionally, portions or all of streams 26 and 27 can be fed to unit 8 separately. The Air separation unit 3 generally, is an on-site cryogenic distillation unit that produces oxygen at high pressure and greater than 90 mole % purity for use in the gasification unit and the light fossil fuel conversion unit. Optionally, oxygen can be supplied from an adsorption based unit or from a pipeline in fluid communication with one or more cryogenic air separation units. A portion of the $CO_2$ is optionally removed from $H_2$-rich syngas 27 in $CO_2$ removal unit 5 as stream 29 or from the portion 36 of byproduct stream 34 being recycled to the light fossil fuel conversion unit 6 (not shown). All or part of the $CO_2$-rich stream 29 can be used elsewhere in the process, e.g. gasification unit 2 (stream 29a), light fossil fuel conversion unit 6 (stream 29b), or upgraded for external use or sequestration.

Gasification unit 2 may comprise one gasifier or a plurality of gasifiers connected in parallel. Gasifiers for different types of carbonaceous feed materials, e.g. coal, petcoke, biomass, are well known in the art.

In the case of coal/petroleum coke, stream 10 may be fed in dry particulate form or may be mixed with water and fed as a slurry to the gasifier 2. Operating pressures for coal gasifiers (e.g. those made by General Electric, Conoco Phillips, Shell, Siemens, etc.) typically range from 300 to 1500 psig and more typically from 500 to 1100 psig. The gasifier 2 is any commercially available gasifier that is used to convert coal, petroleum coke, or similar hydrocarbon feed material to syngas. The configuration can be fluidized bed, moving bed or entrained flow. Most coal gasifiers are of the entrained-flow type especially for higher ranking coals. For lower grade coals with high ash content, fluidized bed gasifier may be a preferred option.

In the case of biomass/MSW, unit 2 typically comprises a moving bed gasifier, such as Lurgi® gasifiers or a fluidized bed gasifier. Examples of commercially available fluidized bed gasifiers include the indirect dual-bed gasifier developed by Silvagas (current technology provider—Rentech) or the direct $O_2$-blown gasifier developed by Gas Technology Institute (current technology providers—Synthesis Energy Systems, Andritz-Carbona) or the direct $O_2$-blown HT Winkler gasifier developed by RWE (current technology provider—Uhde). Another useful type of gasifier for the biomass application, especially MSW, is the plasma-based gasifiers. A discussion of biomass gasifiers can be found in the open literature, e.g. A Survey of Biomass Gasification by Reed & Gaur, 2001. These biomass gasifiers produce synthesis gas which includes hydrogen and carbon monoxide at a molar ratio (hydrogen:carbon monoxide) of less than 2:1. The hydrogen and the carbon monoxide are generated by breakdown of the biomass material.

Within a moving bed gasifier, different reaction zones may be present from top to bottom, namely a drying zone where moisture is released, a devolatilization zone where pyrolysis of biomass takes place, a gasification zone where mainly the endothermic reactions occur, an exothermic oxidation or combustion zone, and an ash bed at the bottom of the gasifier. If the gasification stream contacts the biomass in a countercurrent fashion, hot dry devolatilized biomass reacts with the relatively cold incoming gasification stream, and hot raw gas before exiting as stream 24 exchanges heat with relatively cold incoming biomass.

The temperature profile in each part of a gasifier varies as the biomass moves through the different zones in the gasifier. In the gasification zone the temperature may vary between 1400° F. and 2200° F. The gas stream 24 that is produced and leaves the gasification unit 2 is typically at a temperature of between about 1000° F. and 1800° F.

In fluid bed gasifiers the biomass solids are effectively completely mixed. The temperatures in all parts of the bed are essentially the same and can range from about 1200° F. and 1800° F. The gas stream 24 that is produced and leaves the gasification unit 2 is typically at a temperature of between about 1200° F. and 1800° F.

Use of a high temperature gasifier, e.g. plasma gasifier, where the syngas exits at >2000° F., reduces the complexity of unit 4. In particular, tar and methane content of syngas from high temperature gasifiers tends to be quite low to non-existent. Unit 4 thus may primarily entail cooling/heat recovery and acid gas removal/sulfur management.

The primary benefits of a fluidized bed gasifier are high heat transfer rates, fuel flexibility and the ability to process feedstock with high moisture content. A variety of fluidized bed gasifiers have been and continue to be used/developed for biomass gasification. Key process parameters include type of particle, size of particle and manner of fluidization. Examples of configurations deployed for the biomass gasification application include the bubbling fluidized bed, where bubbles of gas pass through the solids, to circulating fluidized bed, where the particles are carried out with the gas, subsequently separated by a cyclone and returned to the gasifier. Fluidized bed gasifiers are operated below the ash fusion temperature of the feedstock. The generated syngas will contain impurities and thus will require conditioning similar to the moving bed gasifier described above. Tar levels may be less but still not quite as low as that from a plasma gasifier.

The stream 24 produced from gasification of solid carbonaceous feed material typically contains hydrogen and carbon monoxide at a molar ratio less than 1.5:1 and generally less than 1:1.

As stream 24 typically includes impurities that need to be removed prior to feeding stream 26 to liquid production unit 8 as described below, stream 24 is preferably treated in gas conditioning unit 4 to remove impurities. Depending on the feedstock, type of gasifier and gasifier operating conditions the impurities may include particulates, tars, acid gases such as $CO_2$, ammonia, sulfur containing species, and other inorganic substances such as alkali compounds. Impurities may be removed in one unit operation or in a series of unit operations to remove specific contaminants.

Figure 2:
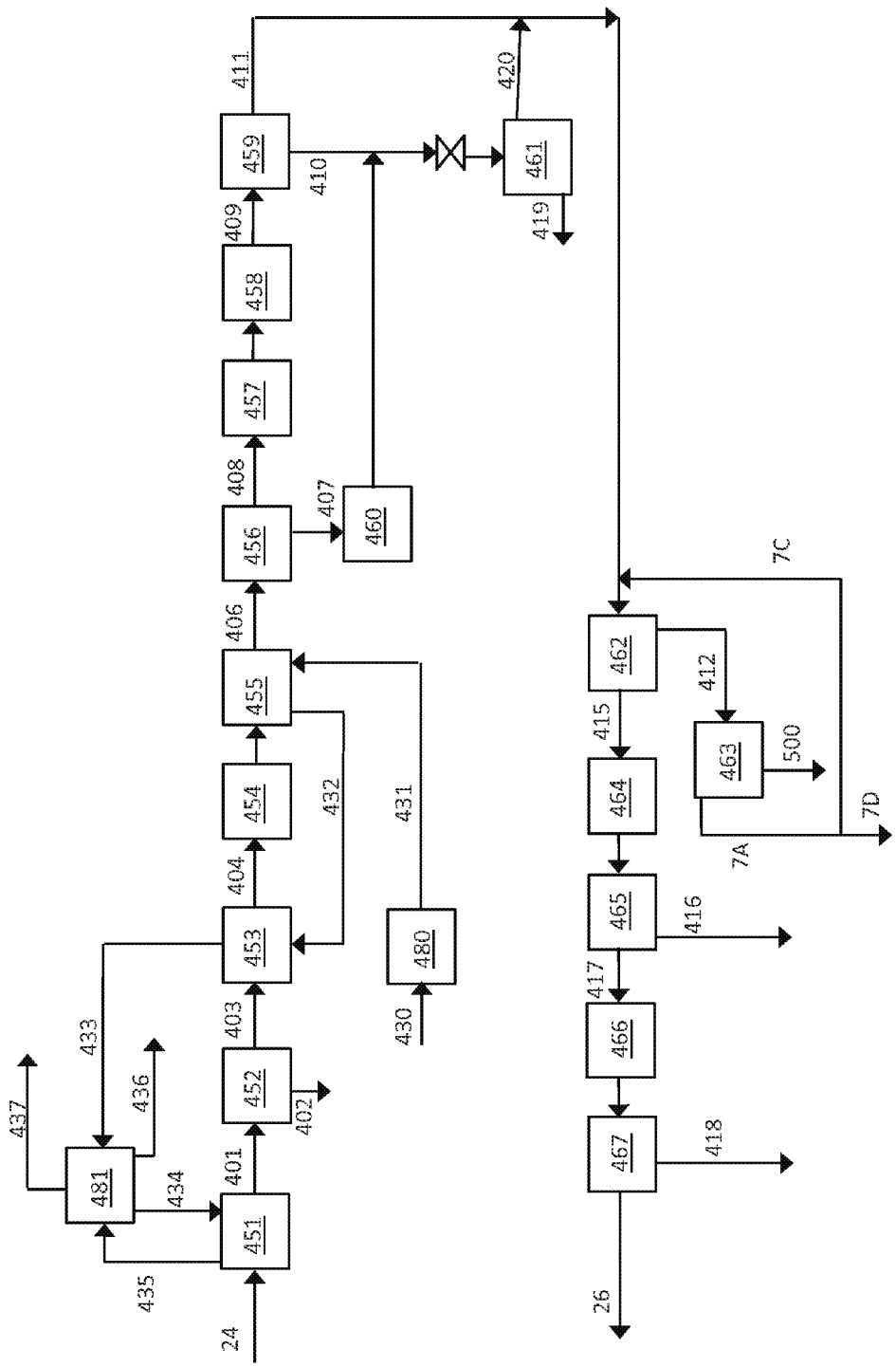
FIG. 2 is a flow diagram of the gasifier syngas conditioning unit.

Now referring to FIG. 2, gas conditioning unit 4 comprises at least an acid gas removal unit 462 and a sulfur recovery unit 463. The gas conditioning unit 4 also employs known technologies such as: scrubbers, cyclones and filters to remove particulates; COS hydrolysis units for conversion of COS to $H_2S$; optional adsorbent beds for reducing impurities to very low levels. The gas conditioning unit 4 also includes any required cooling to ready the gasifier syngas for treatment in the acid gas removal or other conditioning units. Generally, steam is produced in a portion of the gas cooling section for use in other parts of the process. Details are not shown, but should be obvious to those skilled in the art.

Use of a high temperature gasifier, e.g. entrained flow gasifier, where the gasifier syngas exits the gasification section of the gasifier at >1500° F. and generally >1800° F. (note: temperatures leaving quench and/or heat recovery sections can be much lower than 1500° F.), reduces the complexity of gas conditioning unit 4. In particular, tar and methane content of gasifier syngas from a high temperature gasifier tends to be quite low to non-existent. In this situation, the gas conditioning unit 4 may primarily entail cooling/heat recovery, COS hydrolysis, acid gas removal and adsorbent beds for polishing removal of sulfur and other contaminants to levels acceptable for liquid synthesis catalysts.

For the case of multiple gasification trains, each train can include a gasifier as well as downstream unit operations associated with providing feed to the gas conditioning section. This includes scrubbers, cyclones and filters to remove particulates; COS hydrolysis units for conversion of COS to $H_2S$ as well as the heat recovery section. It is typical to have a common acid gas removal system for sulfur and $CO_2$ removal as well as adsorbent beds for polishing removal of sulfur and other contaminants to levels acceptable for liquid synthesis catalysts.

Depending on the feedstock type and composition, gasifier type, operating conditions, levels of oxygen and steam in streams 12 and 14 to the gasifier 2, $CO_2$ content of gasifier derived syngas 24 could vary from around 5 vol. % to 45 vol. %. For the case of coal/petroleum coke, with an entrained flow gasifier, the $CO_2$ content is <20 vol. %. and typically <10 vol. %. Sulfur content of coal/petcoke is typically in the range of 2-5 wt. %. Thus for a feedstock rate of 2000 tons/day of coal, total sulfur content of stream 24 can be around 40 to 100 tons/day. Gasification typically converts greater than 80% of the sulfur in the feedstock to $H_2S$, some into COS.

For the case of biomass feedstock, with a fluidized bed gasifier, $CO_2$ content of stream 24 typically varies from 15 vol. % to 45 vol. %. Sulfur content of biomass can be as much as 0.1 wt % on a dry basis. Hence, for a biofuels facility processing 1000 bone dry tons/day of biomass, total sulfur content of stream 24 can be around one ton/day.

This invention proposes using an acid gas removal system 462 in unit 4 to remove greater than 99% of the sulfur from gasifier syngas 24 and less than 50% of the $CO_2$, preferably less than 35% of the $CO_2$, from gasifier syngas 24. Typically, greater than 50% of the $CO_2$ and preferably greater than 65% of the $CO_2$ in gasifier syngas stream 24 leaves unit 4 in the treated gasifier syngas 26. Removal of carbon dioxide and sulfur species from gasifier syngas 24 can be accomplished with any known available technology (e.g. "Rectisol" or "Selexol" technology) based on physical solvents (e.g. methanol) or chemical solvents (e.g. alkanolamines/amines) or physical adsorbents (PSA or VPSA technology). This invention recommends the use of an amine system. Since the amine system is designed for only partial $CO_2$ removal from gasifier syngas, it will be smaller and will require substantially less energy/ steam. This results in lower capital and operating costs.

For the sulfur quantities associated with a coal feedstock, a Claus unit or an oxy-Claus unit may be used for sulfur recovery. Sulfur is recovered in an elemental form and can be used or disposed. Alternatively, the sulfur removed from the syngas stream can be converted to sulfuric acid.

For the sulfur quantities associated with a biomass feedstock, the options for sulfur removal from the acid gas rich stream leaving the amine system include an adsorbent-based $H_2S$ scavenging system or a regenerable solvent-based system. In the embodiment where a scavenging system is deployed, the adsorbent is typically iron-based. Spent adsorbent will be periodically discharged. An example of such an adsorbent is the HYDROCAT material. An exemplary embodiment of this invention deploys a regenerable chelated iron catalyst-based system for sulfur removal. An example of such a process is the solvent-based LO-CAT® process from Merichem. In this case, sulfur can be disposed in a variety of ways. These include a 15 wt % slurry, a 30 wt % sulfur cake, a 60 wt % cake and molten sulfur.

Since most sulfur removal systems are effective with $H_2S$ versus COS, the use of a COS hydrolysis reactor 454 within unit 4 of FIG. 2 is recommended.

Since the acid gas removal system is designed for only partial $CO_2$ removal, less than 50% and preferably less than 35% of the $CO2$ in the incoming gasifier syngas 24, the flow-rate of acid gas rich stream 412 is substantially reduced. This reduces the size of the sulfur recovery system in all cases.

$CO_2$ enriched gas stream 7A from the sulfur recovery system may contain residual sulfur. However, a portion 7D of the $CO_2$-rich stream 7A from the sulfur recovery unit is sent to the gasification unit 2, typically for use as a reactant or fluidizing agent, and the rest 7C is returned to the acid gas removal system 462. Optionally, a portion of 7D is also used as a carrier gas for the solid material 10. None of the $CO_2$-enriched gas stream 7A from the sulfur recovery system is vented to the atmosphere thereby completely eliminating atmospheric emissions of sulfur from the gasifier syngas.

An example of a typical conditioning unit 4 for a biomass gasifier derived syngas, including acid gas removal and sulfur management, is provided in FIG. 2. Stream 24, which is typically at a temperature between 1200° F. and 1800° F. is sent to syngas heat recovery boiler 451, which produces high pressure saturated steam. Syngas 401 typically exits the boiler at around 800° F. and is sent to candle filter 452, where ash and fines are removed as stream 402 and suitably disposed, e.g. sent to a landfill or used as fuel if carbon content is high enough. Fines-free syngas 403 is cooled to around 450° F. in syngas economizer 453 and fed to COS hydrolysis reactor 454. Typically, about 98% of the COS in stream 404 is hydrolyzed to $H_2S$. The effluent from the COS hydrolysis reactor is further cooled to ~300° F. in syngas economizer 455. Stream 406 is sent to phase separator 456 where hot condensate 407 is separated. Syngas stream 408 is further cooled to around 100° F. by air-cooled heat exchanger 457 and water cooled heat exchanger 458. Stream 409 enters phase separator 459 where cold condensate 410 is separated. Cooled syngas 411 is sent to an acid gas removal unit. Hot condensate 407 is cooled in heat exchanger 460 and mixed with cold condensate 410, reduced in pressure from >100 psia to ~50 psia and sent to phase separator 461. Syngas condensate 419 exits the bottom of the phase separator and is sent to a sour water stripper and possibly carbon beds prior to being sent to a waste water treatment facility. A small amount of condensate flash gas 420 (at 50 psia), containing mostly $CO_2$, $H_2$ and CO and some $H_2S$, exits the top of phase separator 461. This stream 420, after compression (not shown), is mixed with stream 411 and fed to the amine system. Stream 420 can alternatively be recycled to the gasifier (not shown).

Amine system 462 is used to remove greater than 99% of $H_2S$ and less than 50%, preferably less than 35%, of the $CO_2$ from gasifier syngas 411. As a result, greater than 50% and preferably greater than 65% of the $CO_2$ in gasifier syngas 24 leaves with treated gasifier syngas 26 exiting unit 4. Those skilled in the art can recognize that it is possible to design the amine system (462 in FIG. 2) for selective $H_2S$ removal, complete $H_2S$ and $CO_2$ removal or complete $H_2S$ and moderate $CO_2$ removal. Typically, this is accomplished by modifying one or more of composition of the amine solvent, process configuration (e.g. multiple versus single absorber and/ or stripper columns) and operating conditions. Complete removal for $H_2S$ typically refers to removing >99% of the H2S from the syngas, i.e. reducing $H_2S$ levels in the syngas to less than around 10 ppm. Complete removal of $CO_2$ typically refers to removing >80% and typically >95% of $CO_2$ from the syngas while moderate $CO_2$ removal generally refers to removing 5-80% of $CO_2$ from the syngas and typically 10-50% of $CO_2$ from the syngas. For this application, the amine system is designed to accomplish complete $H_2S$ removal and moderate $CO_2$ removal.

Stream 412 containing $H_2S$ is fed to unit 463 for removing sulfur, which could be adsorbent or solvent-based. $H_2S$ absorbed from the syngas can be recovered in a variety of ways. For example as product stream 500 such as a 15 wt % slurry, a 30 wt % sulfur cake, a 60 wt % cake, or molten sulfur. Stream 7A is available for use within the process. Typically, a portion of this stream is compressed and returned (see stream 7A in FIG. 2; compressor not shown) as stream 7D to the gasifier 2 and/or as stream 7C to the feed of the acid gas removal unit within unit 4 (not shown explicitly). None of stream 7A is vented to the atmosphere.

Syngas stream 415 is cooled down to 100° F. in water cooled heat exchanger 464 and sent to knockout drum 465 to remove water 416. Syngas 417 is heated to about 370° F. in syngas heater 466 and then sent to a sulfur polishing unit 467 containing one or more ZnO—CuO beds. This bed is designed for complete $H_2S$ and COS removal. A lead lag arrangement is used to enable change-out of the spent sorbent while plant is in operation. Spent ZnO—CuO adsorbent and stream 418 will be suitably disposed. Syngas stream 26 is at 370° F., >350 psig and typically contains no sulfur. If gasification unit 2 is operating at lower pressure then a compressor is used at a suitable location within the conditioning unit 4 to appropriately raise the pressure of gasifier syngas.

Boiler feed water (BFW) 430 at 30 psig and around 220° F. is pumped to around 740 psig in pump 480. BFW 431 is heated to around 310° F. in syngas economizer 455. BFW 432 is heated to around 460° F. in syngas economizer 453. BFW 433 at about 720 psig is sent to steam drum 481 operating at 720 psig and around 510° F. BFW 434 is sent to the syngas heat recovery boiler 451. Partially vaporized BFW flows back to 481. Saturated steam at 720 psig is recovered as stream 437, which can be superheated for use in the overall project, including for electricity production with a steam turbine. Blowdown stream 436 provides a continuous purge for impurities in the boiler feed water.

With reference to FIG. 1, the resulting treated gasifier syngas stream 26 from stage 4 contains at least hydrogen and carbon monoxide, in a molar ratio of hydrogen to carbon monoxide of less than 1.5:1. The exact composition can vary widely depending on the feedstock type and composition, gasifier type and operating conditions. Generally the molar ratio of hydrogen to carbon monoxide is less than about 0.6 in gasifier syngas from coal or petcoke, and less than 1.2 in gasifier syngas from biomass. Before stream 26 is fed to liquid fuel production unit 8, it is combined with stream 27 that contains hydrogen and carbon monoxide formed in light fossil fuel conversion unit 6.

Air separation unit 3 typically is an on-site cryogenic distillation unit that supplies oxygen to the gasification unit 2. Ambient air is compressed, purified to remove impurities, cooled, and distilled at cryogenic temperatures using known technologies. Liquid oxygen is withdrawn from distillation column, pumped to elevated pressure, vaporized and superheated. The air separation unit 3 may contain one or more trains of equipment such as for feed air compression, purification, heat exchange, cryogenic distillation, liquid oxygen pumping, etc. The air separation unit can be designed to supply high pressure high purity oxygen to both gasification unit and light fossil fuel conversion unit. Oxygen may be provided at a single high pressure or different pressures to satisfy gasification unit 3 and light fossil fuel conversion unit 6 requirements.

Light fossil fuel conversion unit 6 processes light fossil fuel 18, steam 20, and optionally oxygen 16 to produce hydrogen and carbon monoxide containing $H_2$-rich syngas stream 27. By-product fuel gas 36 may also be an input to the light fossil fuel conversion unit. Options for the light fossil fuel conversion unit include, autothermal reformer (ATR), SMR, or a combination such as a SMR coupled to a downstream ATR (also known as an SMR with secondary reformer). For ATR and SMR coupled with ATR, oxygen is needed. When only an SMR is used for converting light fossil fuel, oxygen is not needed. $H_2$-rich syngas stream 27 typically contains hydrogen, carbon monoxide, carbon dioxide, water vapor, methane and inerts such as nitrogen, argon. The composition of $H_2$-rich syngas stream 27, and in particular the ratio of hydrogen to carbon monoxide, primarily depends on the type of light fossil fuel conversion unit, ratio of steam to carbon fed to unit 6, gas temperature leaving the light fossil fuel conversion reactor and the amount of $CO_2$ being fed to unit 6. Increasing the ratio of steam to carbon fed to reactor 6 increases the ratio of hydrogen to carbon monoxide in $H_2$-rich syngas stream 27, but can increase the overall energy requirements of the system (taking into account the incremental additional energy required to produce additional steam that is fed to reactor 6). Higher $CO_2$ levels in the feed to reactor 6 will decrease the $H_2/CO$ ratio in syngas 27. The ratio of hydrogen to carbon monoxide in $H_2$-rich syngas stream 27 is also influenced by the level of higher hydrocarbons in streams 18 and 36. For significant levels of these species, a pre-reformer may be required (not shown), which converts higher hydrocarbons to methane, $H_2$, CO and $CO_2$. Pre-reformers are typically catalyst-based systems. In this invention, the aforementioned factors are adjusted to generate a H2-rich syngas stream 27 with a $H_2/CO$ ratio of at least 2:1, preferably in the range of 2.5:1-10:1 and more preferably in the range of 3:1 to 8:1. The $H_2$-rich syngas stream 27 is combined with treated gasifier syngas stream 26 to form stream 30 that contains hydrogen and carbon monoxide in a molar ratio of at least 1.6:1. Stream 30 fed to a liquid fuel production unit 8 producing Fischer-Tropsch liquids contains hydrogen and carbon monoxide in a ratio that is generally in the range of 1.6:1 to 2.2:1. Stream 30 fed to a liquid fuel production unit 8 producing methanol contains hydrogen, carbon monoxide and carbon dioxide such that the $(H_2—CO_2)/(CO+CO_2)$ ratio is in the range of 2 to 2.4. Depending on the ratio of CO to $CO_2$, the $H_2/CO$ ratio is typically in the range of 2.2 to 3.6.

Optionally, a portion of $H_2$-rich syngas stream 27 or entire stream 27 is treated in $CO_2$ removal unit 5. Resulting treated $H_2$-rich syngas stream 28 can be combined with balance of $H_2$-rich syngas stream 27 that bypassed unit 5, and fed to the liquid fuel production unit 8. The carbon dioxide removal process can be carried out using commercially available technologies such as those employing a physical solvent (e.g. methanol) or a chemical solvent (alkanolamine), or which employ physical adsorbent technology such as a PSA or VPSA. Preferably unit 5 deploys amine technology. $CO_2$-rich stream 29 is available for use in gasification unit 2 and/or for use in light fossil fuel conversion unit 6 and/or for upgrading prior to external use or sequestration. An alternative location (not shown in FIG. 1) of the optional $CO_2$ removal unit 5 is on all or a portion of gaseous byproduct 36 being returned to light fossil fuel conversion unit 6.

With reference to FIG. 1, one embodiment of the light fossil fuel conversion unit 6 contains an autothermal reformer that has a first reaction zone formed by a burner (not shown). Exothermic oxidation reaction releases heat that gets consumed in subsequent endothermic reforming reactions. An example of exothermic reaction that occurs in the first reaction zone is:

$$CH_4 + 2O_2 \Leftrightarrow CO_2 + 2H_2O$$

The resultant intermediate product from the first reaction zone then passes to a catalyst bed below the burner reforming and water gas shift reactions take place. The overall reactions are typically defined by the following:

$$CH_4 + H_2O \Leftrightarrow CO + 3H_2$$

$$CO_2 + H_2 \Leftrightarrow CO + H_2O$$

$$CH_4 + CO_2 \Leftrightarrow 2CO + 2H_2$$

The exothermic oxidation reactions provide the energy necessary to drive steam reforming reactions over the catalyst in the autothermal reformer. No external heating is provided. Any supported catalyst active for steam reforming may be used. For instance, Group VIII metals (i.e. Fe, Co, Ni, Ru, Rh, Pd, Os, Ir, Pt) may be loaded onto ceramic or metal-based supports, such as pellets, shaped particles, honeycomb monoliths, foam monoliths, or corrugated foil monoliths. A bed of Ni-loaded ceramic shaped particles could be used. The catalyst bed could include a metal, corrugated foil monolith as a support for one or more noble metal catalysts (e.g. Pt, Pd, Rh, Ru).

With reference to FIG. 1, another embodiment of the light fossil fuel conversion unit 6 contains a Steam Methane Reformer (SMR). The fossil-fuel hydrocarbon containing feed 18, typically natural gas may be split into feed and fuel streams. The natural gas feed stream and superheated steam 20 undergo reforming reactions in the steam methane reformer tubes located in a radiant section of the steam methane reformer. No oxygen 16 is required. The reformer tubes are packed with a catalyst that is used to promote the steam methane reforming reactions. Steam methane forming reactions are endothermic and hence, heat is supplied to the reformer tubes to support the reactions by burners firing into the radiant section of the steam methane reformer. In steam methane reforming, the hydrocarbon containing stream, steam and, optionally, a recycle stream, is fed into a reactor. Commonly the reactor is formed by a bundle of tubes containing a catalyst. The tube bundle is located in a furnace and a fraction of natural gas 18 may be used as a fuel to the furnace. The following reactions take place inside the catalyst packed tubes:

$$CH_4+H_2O \Longleftrightarrow CO+3H_2$$

$$CH_4+CO_2 \Longleftrightarrow 2CO+2H_2$$

$$CO_2+H_2 \Longleftrightarrow CO+H_2O$$

The crude synthesis gas product from the reactor, which contains hydrogen, carbon monoxide, and water, is cooled down in a series of heat exchangers while recovering thermal energy contained in it for steam production and preheating feed streams to the reactor.

Light fossil fuel conversion unit 6 can be designed to include both an SMR and ATR, in parallel or in series. When in series, the ATR is typically located downstream of the SMR.

Stream 18 can be obtained directly from a supply of natural gas. Alternatively, all or part of stream 18 can be obtained as the waste gas or offgas from another chemical or refining operation, or from sources such as landfill gas or digester gas. All or a portion 36 of stream 34 can be utilized in light fossil fuel conversion unit (6) to facilitate formation of the $H_2$-rich syngas (27). When fossil fuel conversion unit (6) contains a steam methane reformer, it is preferable to direct the entire stream 34 as stream 36 to light fossil fuel conversion unit (6). Typically, 50%-80% of the byproduct stream is used as SMR feed. The remainder is used as SMR fuel. When light fossil fuel conversion unit contains an autothermal reformer or partial oxidation reactor, 50%-80% of stream 34 is returned to light fossil fuel conversion unit 6 as stream 36. The entire stream 36 is used as feedstock. The remainder of the byproduct, stream 38, can be used as fuel at another location, e.g. fired heater or auxiliary boiler (not shown in the Figure).

Streams 26 and/or 27 or combined stream 30 are optionally compressed (not shown) before feeding to reactor 8. Higher pressure gasifiers such as entrained flow technologies can result in stream 26 pressures sufficient for use in unit 8 without compression. When compression of both streams 26 and 27 is required, it may be preferable to compress the combined stream 30 as it provides the benefit of a reduction in the amount of equipment needed for compression. If the end-product is a diesel-type of fuel, a single stage of compression may suffice, and in some cases no compression may be required. The preferred embodiment of FIG. 1 entails production of FT liquids (diesel and naphtha) and uses 0-1 stages of compression. For alcohols, e.g. methanol, ethanol, 2-3 stages of compression may be required. The compression will be accompanied with a condensate removal system, also not shown. (Stream 26 and 27, and/or stream 30 could be depressurized through a valve or an expander if the pressure required by unit 8 is less than the pressure of streams 27 and/or 26.) Stream 30 or a portion of stream 27 can be fed into one or more than one location in the reactor or reactors that produce the desired fuel product (not shown).

In one aspect product fuel is produced from syngas 30 by a catalytic conversion process, e.g. Fischer-Tropsch process. However, the present invention is advantageous also when the product fuel is produced by fermentation or other conversion mechanisms.

Considering Fischer-Tropsch conversion in general, the Fischer-Tropsch reaction may be carried out in any reactor that can tolerate the temperatures and pressures employed. The pressure in the reactor is typically between 300 psia and 1500 psia, while the temperature may be between 400° F. and 700° F. Preferably, the Fischer-Tropsch hydrocarbon synthesis stage is a low temperature Fischer-Tropsch hydrocarbon synthesis stage. The reactor will thus contain a Fischer-Tropsch catalyst, which could be in particulate form. The catalyst may contain, as its active catalyst component, Co, Fe, Ni, Ru, Re and/or Rh. The catalyst may be promoted with one or more promoters selected from an alkali metal, V, Cr, Pt, Pd, La, Re, Rh, Ru, Th, Mn, Cu, Mg, K, Na, Ca, Ba, Zn and Zr. The catalyst may be a supported catalyst, in which case the active catalyst component, e.g. Co, is supported on a suitable support such as alumina, titania, silica, zinc oxide, or a combination of any of these. The preferred embodiment in this invention uses a Co-based catalyst. For a biomass feedstock, capacity of the hybrid plant is likely to be small (e.g. 1,000-10,000 bpd of FT liquids production) and a fixed bed tubular reactor using Co-based catalyst is likely to be the preferred reactor configuration. For a larger scale coal-based plant, a slurry bed reactor using Co-based catalyst in particulate form is likely to be the preferred reactor configuration. While less preferable, fixed bed tubular reactors could also be deployed.

In the Fischer-Tropsch conversion, the hydrogen and carbon monoxide in stream 30 react under pressure in the presence of a catalyst at reaction temperature in the indicated range to yield a mixture of alkanols, alkanes, or both, which may contain 1 to greater than 60 carbon atoms. The atmospheric boiling point range for the higher hydrocarbons, i.e. species with greater than 60 carbon atoms, can be between 1000-1200° F. Water and carbon dioxide are also produced.

As the Fischer-Tropsch reaction is exothermic, steam-producing cooling coils are preferably present in the Fischer-Tropsch reactors to remove the heat of reaction. This steam can be fed to reactor 6 as part of the steam reactant in the steam methane reforming reaction or used elsewhere in the overall process, e.g. regeneration of amine solvent, drying of biomass. Fresh catalyst is preferably added to reactor 8 when required without disrupting the process to keep the conversion of the reactants high and to ensure that the particle size distribution of the catalyst particles is kept substantially constant.

The manner of carrying out a variation of the Fischer-Tropsch reaction for producing alcohols from syngas is well known and has been practiced for several years. Useful disclosure is found in "Synthesis of Alcohols by Hydrogenation of Carbon Monoxide". R. B. Anderson, J. Feldman and H. H. Storch, Industrial & Engineering Chemistry, Vol. 44, No. 10, pp 2418-2424 (1952). Several patents also describe different aspects of the Fischer-Tropsch conversion process that can be practiced to produce alkanols including ethanol. For example, U.S. Pat. No. 4,675,344 provides details on process conditions, e.g. temperature, pressure, space velocity, as well as catalyst composition to optimize the Fischer-Tropsch process for increased production of $C_2$ to $C_5$ alcohols versus methanol. This patent also indicates that a desirable hydrogen:carbon monoxide ratio in the gas feed stream is in the range of 0.7:1 to 3:1. U.S. Pat. No. 4,775,696 discloses a novel catalyst composition and a procedure for synthesis of alcohols via the Fischer-Tropsch conversion. U.S. Pat. No. 4,831,060 and U.S. Pat. No. 4,882,360 provide a comprehensive discussion on the preferred catalyst composition and synthesis procedures for a producing a product mix with a higher ratio of $C_{2-5}$ alcohols versus methanol. The catalyst is typically comprised of:

(1) A catalytically active metal of molybdenum, tungsten or rhenium, in free or combined form;

(2) A co-catalytic metal of cobalt, nickel or iron, in free or combined form;

(3) A Fischer-Tropsch promoter, e.g. alkali or alkaline earth metals such as potassium;

(4) An optional support, e.g. alumina, silica gel, diatomaceous earth. Use of the above catalyst composition provides both high production rates and high selectivities.

When the desired product fuel is methanol, the catalytic conversion is operated in any manner known to favor the formation of methanol, such as carrying out the reaction with a copper-zinc catalyst.

The overall stoichiometry for the production of alcohols from syngas using the Fischer-Tropsch process can be summarized as follows ("Thermochemical Ethanol via Indirect Gasification and Mixed Alcohol Synthesis of Lignocellulosic Biomass". S. Phillips, A. Aden, J. Jechura, D. Dayton and T. Eggeman Technical Report, NREL/TP-510-41168, April 2007):

$nCO+2nH_2 \Leftrightarrow C_nH_{2n+1}OH+(n-1)H_2O$

As can be seen from this stoichiometry, the optimal molar ratio of hydrogen to carbon monoxide in the syngas is 2:1. A slightly lower ratio is compensated somewhat by the catalysts used in for mixed alcohol production (e.g. molybdenum sulfide), which are known to provide some water-gas shift activity. Occurrence of the water-gas shift reaction, shown here:

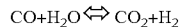

$CO+H_2O \Leftrightarrow CO_2+H_2$ in the Fischer-Tropsch reactor effectively increases the hydrogen:carbon monoxide ratio and correspondingly, increases conversion of syngas to ethanol.

Example

The process configuration shown in FIG. 1 was simulated. Two cases were run for a biomass-to-fuel facility processing 900 bone dry tons/day of wood chips. The gasification unit 2 contains an $O_2$-blown fluidized bed type gasifier operating at a pressure of 350 psig with an exit temperature of 1800° F. Gasifier syngas 24 produced in the gasification unit 2 on a dry volumetric basis contains 31% $H_2$, 35% CO, 26% $CO_2$, 7% $CH_4$, 0.07% $N_2$, 0.08% Ar, 500 ppm total sulfur. This syngas is processed in a gas conditioning unit 4 containing an amine system to produce treated gasifier syngas 26 and a regenerable solvent-based system using a chelated iron catalyst for sulfur removal from the process. The treated gasifier syngas 26 is blended with H2-rich syngas 27 from the light fossil fuel conversion unit 6 to form mixed syngas 30. Optional unit 5 for $CO_2$ removal is not used. Light fossil fuel conversion unit 6 contains a steam methane reformer (SMR). This mixed syngas (30) containing hydrogen and carbon monoxide in a $H_2$/CO ratio of 1.9:1 is converted into liquid fuel product 32, Fischer-Tropsch (FT) liquids through the use of Cobalt-based tubular fixed bed reactors. The primary liquid product is diesel. Naphtha is the by-product (not shown in FIG. 1). The liquids upgrading section (not shown) includes a hydrocracker to crack the $C_{20+}$ species and maximize the production of hydrocarbons in the middle distillate range. All the tail gas (stream 34) is recycled to the light fossil fuel conversion unit 6. A portion of stream 36, as well as a fraction of natural gas 18 is converted in the light fossil fuel conversion unit 6 to form $H_2$-rich syngas 27, and the balance of these streams serve as fuel to supply heat for the endothermic steam methane reforming reactions. Steam to carbon ratio for the SMR is 3.2:1. Simulation results are summarized in Table 1. In both cases, >99% of the $H_2S$ in the gasifier syngas (stream 24) is removed by the gas conditioning unit 4:

Case 1—This is the base case where $CO_2$ content in the bio-syngas, stream 24 is reduced from 26 vol. % to 1.5 vol. % in stream 26. 90% of the byproduct gas from the liquid fuel production unit is fed as a reactant to the SMR.

Case 2 (This invention)—$CO_2$ content in the gasifier syngas 24 is reduced from 26 vol. % to 18.6 vol. % in stream 26. $CO_2$ removed is returned to the gasifier. 63% of the byproduct gas from the liquid fuel production unit is fed as a reactant to the SMR.

|  | Case 1 | Case 2 |
|---|---|---|
| Gasifier syngas 24, MMSCFD | 45.2 | 45.2 |
| Treated gasifier syngas 26 | | |
| Flow, MMSCFD | 33.9 | 41.1 |
| H2/CO ratio | 0.87 | 0.87 |
| CO2, mol % | 1.5% | 18.6% |
| Unit 4 | | |
| CO2 rejected in unit 4, tons/day | 650 | 230 |
| % of CO2 in gasifier syngas removed by unit 4 | 95.6% | 34.1% |
| Calculated steam consumption, MMBtu/day | 1950 | 690 |
| CO2-rich stream 7D to gasifier, MMSCFD | 4 | 4 |
| CO2 to vent, tons/day | 418 | 0 |
| Acid gas rich stream to sulfur recovery system in unit 4, MMSCFD | 11.3 | 4.1 |
| Byproduct stream 36, fraction as feed | 0.9 | 0.63 |
| Natural gas 18 split, fraction as feed | 0.49 | 0.77 |
| H2-rich Syngas (27) H2/CO ratio | 3 | 3 |
| H2-rich Syngas (27) CO2 vol. % | 16.4% | 16.8% |
| H2-rich Syngas (27) flow, MMscfd | 76.9 | 76.5 |
| Mixed Syngas (30) H2/CO ratio | 1.9 | 1.9 |
| Mixed Syngas (30) CO2 vol. % | 11.8% | 17.5% |
| Mixed Syngas (30) flow, MMscfd | 111 | 118 |
| Biomass (10), tpd (dry) | 900 | 900 |
| Light Fossil Fuel (Natural Gas), MMscfd | 15 | 15 |
| Imported Electricity, MW | 12 | 7.4 |
| Liquid Fuel Product (32), bbl/d | 2,650 | 2,650 |

The level of $CO_2$ in the FT byproduct gas in Case 2 will be higher than that for Case 1. When combined with the need to maintain the steam to carbon ratio at 3.2:1, it becomes necessary to reduce the portion of the FT byproduct gas being used as a reactant in the SMR from 90% to 63%. The output of liquids is the same as in Case 1. However, the amount of $CO_2$ being removed from stream 24 is about 35% that of the base case. This will reduce capital and operating costs. Case 2 is expected to achieve a reduction in steam consumption of about 1260 MMBtu/day versus Case 1. This additional steam can be used to generate about 4.6 MW, which reduces the imported electricity by 38% versus Case 1. The lower level of $CO_2$ removal also decreases the required height for the absorption column and decreases the solvent flow-rate. This will translate to savings in capital costs and to some extent operating costs as well. Additionally, the lower level of $CO_2$ removal reduces the flow of acid gas to the sulfur recovery unit by >60%. This reduces the capital cost of the regenerable chelated iron-catalyst based sulfur recovery unit by 50%. The higher level of $CO_2$ in the mixed syngas feed to the liquid fuel production unit may increase the capital cost of this portion of the plant, however the net liquid fuel production cost is expected to be lower.

While the invention has been described in detail with reference to specific embodiments thereof, it will become apparent to one skilled in the art that various changes and modifications can be made and equivalents employed, without departing from the scope of the appended claims.

What is claimed is:

1. A method for liquid production, comprising:
   a) converting a solid carbonaceous material in a gasification unit to form a gasifier syngas;
   b) passing the gasifier syngas to a gas conditioning unit, and treating the gasifier syngas therein, where said gas conditioning unit contains an acid gas removal unit designed to remove less than 50% of $CO_2$ in gasifier syngas;
   c) forming at least a treated gasifier syngas stream containing at least 50% of $CO_2$ in the gasifier syngas, a $CO_2$-enriched gas stream, and a sulfur-enriched stream;
   d) utilizing at least 90% of the $CO_2$-enriched gas stream in the formation of the gasifier syngas;
   e) converting a light fossil fuel in a light fossil fuel conversion unit to form a $H_2$-rich syngas comprising $H_2$ and CO at a $H_2$/CO mole ratio of at least 2:1;
   f) combining treated gasifier syngas and $H_2$-rich syngas to form a mixed syngas having a $H_2$/CO ratio greater than that of treated gasifier syngas stream;
   g) converting the mixed syngas to form a liquid fuel product and a byproduct stream comprising one or more of hydrogen, CO, water vapor, methane, and hydrocarbons containing 2 to 8 carbon atoms and 0 to 2 oxygen atoms; and
   h) reacting up to 100% of the byproduct stream in the light fossil fuel conversion unit to facilitate formation of the H2-rich syngas.

2. The method according to claim 1, further comprises reacting 100% of the byproduct stream in the light fossil fuel conversion unit to facilitate formation of the $H_2$-rich syngas.

3. The method according to claim 1, further comprises employing 20% to 50% of the byproduct stream as a fuel elsewhere in the plant.

4. The method according to claim 1, further comprises reacting 50% to 80% of the byproduct stream routed to the light fossil fuel conversion unit and the balance of the routed byproduct stream serves as fuel in said light fossil fuel conversion unit.

5. The method according to claim 1, further comprises treating at least a portion of the byproduct stream in a $CO_2$ removal unit prior to reacting in the light fossil fuel conversion unit.

6. The method according to claim 1, wherein at least a portion of the $H_2$-rich syngas is treated in a $CO_2$ removal unit to form a treated $H_2$-rich syngas.

7. The method according to claim 1, wherein the light fossil fuel conversion unit comprises an autothermal reactor producing the $H_2$-rich syngas.

8. The method according to claim 1, further comprises forming the $H_2$-rich syngas in the light fossil fuel conversion unit, wherein said conversion unit includes a steam methane reformer having tubes packed with catalyst.

9. The method according to claim 8, further comprises forming the $H_2$-rich syngas in the light fossil fuel conversion unit, wherein said conversion unit includes an autothermal reactor.

10. The method according to claim 1, further comprises routing the gasifier syngas through an acid gas removal system, contained in the gas conditioning unit.

11. The method according to claim 1, further comprising forming a sulfur enriched stream from sulfur recovery system contained in conditioning unit.

12. The method according to claim 10, further routing a stream exiting acid gas removal system through a sulfur polishing unit contained in the gas conditioning unit to produce a treated gasifier syngas.

13. The method according to claim 1, further comprises recycling a balance of the $CO_2$-enriched gas stream to acid gas removal system, thereby reducing sulfur emissions to near zero levels.

14. The method according to claim 1, further comprises forming a treated gasifier syngas stream containing at least 65% of the $CO_2$ in gasifier syngas.

15. The method according to claim 5, wherein the $CO_2$ removal unit is an amine system.

16. The method according to claim 10, wherein the acid gas removal system is an amine system.

* * * * *